United States Patent
Baik et al.

(10) Patent No.: US 8,437,075 B2
(45) Date of Patent: May 7, 2013

(54) MULTI-LAYERED HYBRID METAMATERIAL STRUCTURE

(75) Inventors: Chan-wook Baik, Yongin-si (KR); Jong-min Kim, Yongin-si (KR); Chang-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/095,100

(22) Filed: Apr. 27, 2011

(65) Prior Publication Data
US 2012/0075692 A1 Mar. 29, 2012

(30) Foreign Application Priority Data
Sep. 27, 2010 (KR) .................. 10-2010-0093293

(51) Int. Cl.
*H01Q 15/0086* (2006.01)
*G02B 1/002* (2006.01)

(52) U.S. Cl.
USPC .......................................... 359/346; 333/219

(58) Field of Classification Search ............ 359/333, 359/344, 346; 333/219
See application file for complete search history.

(56) References Cited

U.S. PATENT DOCUMENTS

| | | | | |
|---|---|---|---|---|
| 5,057,803 A * | 10/1991 | Ooi et al. | | 333/204 |
| 7,386,195 B2 * | 6/2008 | Chern et al. | | 385/1 |
| 7,492,329 B2 * | 2/2009 | Wang et al. | | 343/909 |
| 7,522,124 B2 * | 4/2009 | Smith et al. | | 343/909 |
| 7,525,711 B1 * | 4/2009 | Rule et al. | | 359/244 |
| 7,545,841 B2 * | 6/2009 | Wang et al. | | 372/50.22 |
| 7,580,604 B2 | 8/2009 | D'Aguanno et al. | | |
| 2001/0038325 A1 | 11/2001 | Smith et al. | | |
| 2008/0165079 A1 | 7/2008 | Smith et al. | | |
| 2008/0267243 A1 * | 10/2008 | Wang et al. | | 372/69 |
| 2009/0040131 A1 * | 2/2009 | Mosallaei | | 343/911 R |
| 2009/0096545 A1 | 4/2009 | O'Hara et al. | | |
| 2009/0160718 A1 | 6/2009 | Yen et al. | | |
| 2009/0262766 A1 * | 10/2009 | Chen et al. | | 372/26 |
| 2010/0019868 A1 * | 1/2010 | Hyde et al. | | 333/219 |
| 2010/0053763 A1 | 3/2010 | Chowdhury et al. | | |
| 2010/0079217 A1 | 4/2010 | Morton et al. | | |
| 2010/0109971 A2 | 5/2010 | Gummalla et al. | | |
| 2010/0271692 A1 * | 10/2010 | Hor et al. | | 359/356 |
| 2012/0105970 A1 * | 5/2012 | Ueda | | 359/642 |
| 2012/0170114 A1 * | 7/2012 | Domash et al. | | 359/359 |
| 2012/0236895 A1 * | 9/2012 | Miles | | 372/55 |

FOREIGN PATENT DOCUMENTS

KR 10-2009-0063599 A 6/2009
KR 10-2010-0046579 A 5/2010

* cited by examiner

*Primary Examiner* — Mark Hellner
*Assistant Examiner* — Ari M Diacou
(74) *Attorney, Agent, or Firm* — Sughrue Mion, PLLC (57) ABSTRACT

A metamaterial structure is provided, including a substrate and a plurality of resonators that are provided on different surfaces of the substrate or different layers of the substrate. The resonators have resonance characteristics different from each other, and the metamaterial structure has a permittivity, a permeability, and a refractive index respectively different from those of the substrate in a predetermined frequency bandwidth.

21 Claims, 10 Drawing Sheets

FIG. 17

MULTI-LAYERED HYBRID METAMATERIAL STRUCTURE

CROSS-REFERENCE TO RELATED APPLICATION

This application claims the benefit of Korean Patent Application No. 10-2010-093293, filed on Sep. 27, 2010, in the Korean Intellectual Property Office, the disclosure of which is incorporated herein in its entirety by reference.

BACKGROUND

1. Field

The present disclosure relates to artificial material structures, electromagnetic characteristics of which are controlled, and more particularly, to multi-layered hybrid metamaterial structures.

2. Description of the Related Art

Recently, many studies have been conducted on metamaterials which have electromagnetic characteristics that may be controlled by a new method. Metamaterials are referred to as new materials or structures because their optical characteristics, such as scattering parameter, refractive index, permittivity and permeability, may be arbitrary controlled. A new left-hand rule may be applied to the metamaterial instead of the conventionally well known Fleming's right-hand rule, and actively using the metamaterials, light may be modulated by using electrical variable characteristics. Due to the characteristics of metamaterials, studies have been conducted related to electromagnetic radiation such as radio frequency (RF) waves, micrometer waves, Tera-Hertz (THz) waves, infrared rays, and visible light. In particular, metamaterials are very important in applications to fields such as biophysics, medicine, spectroscopy, imaging, and security. In the case of a split-ring resonator (SRR), in which the characteristics of the metamaterials have been well studied due to their superior resonance characteristics, electrical and magnetic control is possible, and thus, studies on the control of permeability characteristics have been conducted.

SUMMARY OF THE INVENTION

Provided are multi-layered hybrid metamaterial structures that have increased resonance characteristics and may be actively controllable.

Additional aspects will be set forth in part in the description which follows and, in part, will be apparent from the description, or may be learned by practice of the presented embodiments.

According to an aspect of an exemplary embodiment, a metamaterial structure includes: a substrate; and a plurality of resonators that are provided on different surfaces of the substrate or on different layers of the substrate and have resonance characteristics different from each other. The metamaterial structure has a permittivity, a permeability, and a refractive index respectively different from those of the substrate in a predetermined frequency bandwidth. The metamaterial structure may be used as a resonator having a negative refractive index (NIM), as a modulator for RF waves, micrometer waves, THz waves, infrared rays, or visible light, as a switch, as a pause shifter, or as a filter.

The resonators may include first and second resonators having resonance frequencies different from each other. Since the metamaterial structure includes the resonators having resonance frequencies different from each other, an electromagnetic wave may be controlled in a wide bandwidth frequency.

Each of the resonators may be an SRR having at least one gap. A first resonator may be provided on a first layer of the substrate and the second resonator may be provided on a second layer of the substrate, and a gap of the first resonator and a gap of a second resonator may have different sizes. Also, the gaps of the first and second resonators may be oriented in different directions. The polarizing characteristic of an electromagnetic wave that passes through the metamaterial structure may be changed according to the directions in which the gaps are oriented. Since the resonators have gaps oriented in different directions from each other, the resonators may be less dependent on the polarizing direction. Of course, the gap of the resonator provided on the first layer and the gap of the resonator provided on the second layer may be oriented in the same direction.

The substrate may be a single layer substrate including one dielectric material or a multi-layer substrate including at least two different dielectric materials. The dielectric may be formed of an insulating material, an n-type semiconductor material, or a p-type semiconductor material.

The resonators may be provided on opposite surfaces of a single substrate. Also, if the substrate is a multi-layer substrate, at least one resonator may be provided on each of the multiple layers. The multi-layer substrate may be a stacked type in which substrates are stacked after forming the resonators on each of the substrates, or may be formed through sequential processes of deposition and plating.

Power sources may be applied to the resonators. For this purpose, the metamaterial structure may further include electrodes that are electrically connected to the resonators. The layer where the resonators are provided may be an n-type or p-type semiconductor layer doped with an n-type or p-type dopant. The substrate may further include an insulating layer. The insulating layer may insulate between the conductive semiconductor layers or insulate the metamaterial structure from the outside.

Of the resonators, the resonators provided on different layers may be independently electrically controlled.

In a multi-layer substrate, areas of the layers of the substrate may decrease from a lowermost layer to an uppermost layer, and at least a portion of each of the resonators disposed on the layers may be exposed to the outside.

A metamaterial structure according to embodiments described herein may be used as a modulator for RF waves, micrometer waves, THz waves, infrared rays, or visible light. In this case, the substrate may be a transparent material with respect to the corresponding wavelength of an electromagnetic wave or may be thin enough to sufficiently transmit the corresponding electromagnetic wave.

BRIEF DESCRIPTION OF THE DRAWINGS

These and/or other exemplary aspects will become apparent and more readily appreciated from the following description of the exemplary embodiments, taken in conjunction with the accompanying drawings of which.

DETAILED DESCRIPTION

Exemplary embodiments will now be described more fully with reference to the accompanying drawings. It will be understood that when an element or layer is referred to as being "on" another element or layer, the element or layer may be directly on another element or layer or intervening elements or layers. In the drawings, the thickness of each of layers or sizes may be exaggerated for convenience of explanation or clarity. Like reference numerals in the drawings denote like elements, and portions nothing to do with the description are omitted.

A metamaterial according to an exemplary embodiment is an artificial structure having electromagnetic characteristics that may not be readily seen in ordinary materials present in nature. The characteristics of a metamaterial are due to its structural components, such as resonators, rather than to the material composition itself, and thus, a metamaterial may be referred to as a metamaterial structure.

Figure 1:
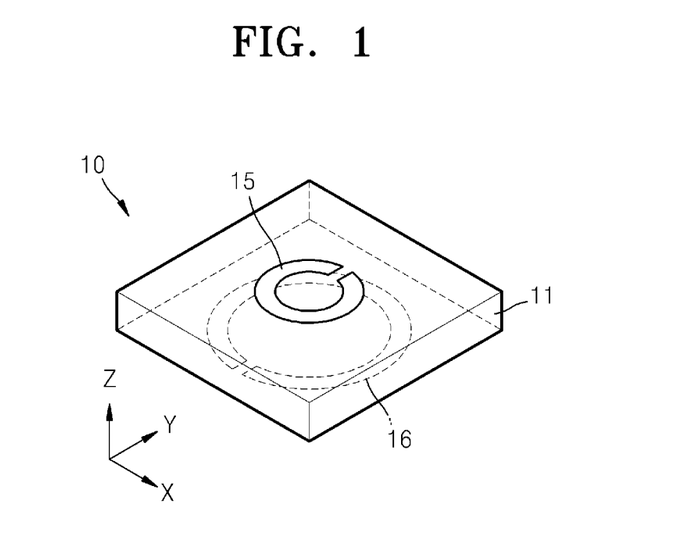
FIG. 1 is a schematic perspective view of a metamaterial structure according to an exemplary embodiment.
Figure 2:
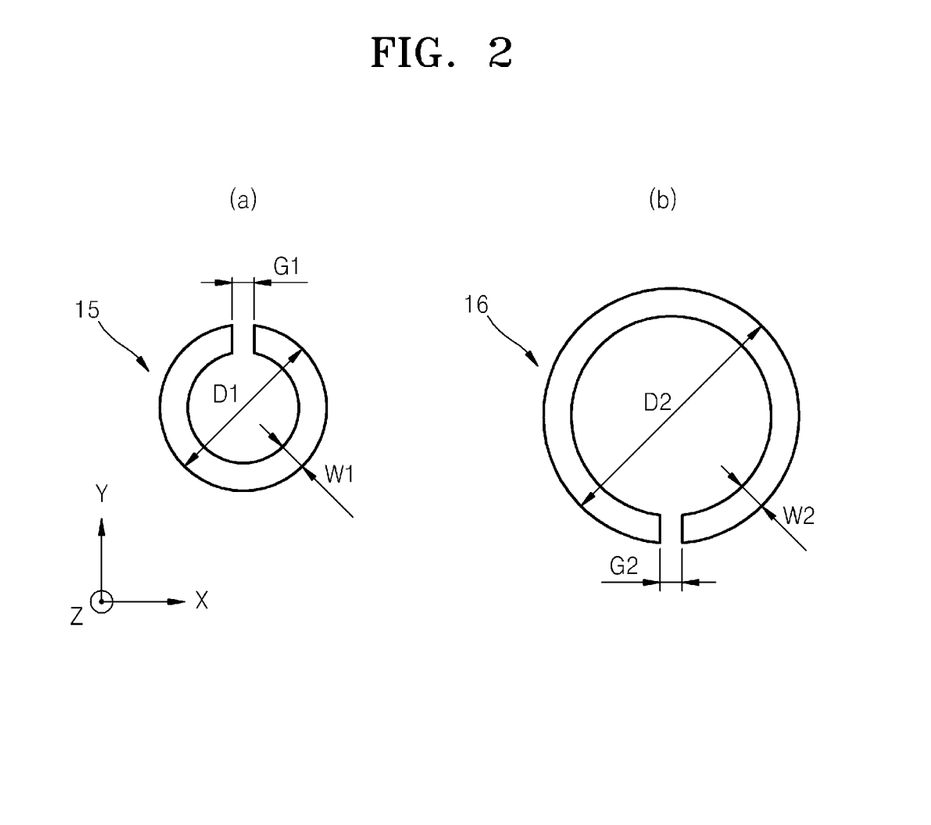
FIG. 2 shows resonators provided on both surfaces of the metamaterial structure of FIG. 1.

FIG. 1 is a schematic perspective view of a metamaterial structure 10 according to an exemplary embodiment. FIG. 2 shows first and second resonators 15 and 16 provided on opposite surfaces of the metamaterial structure 10 of FIG. 1.

Referring to FIG. 1, the metamaterial structure 10 according to the current embodiment includes a substrate 11 and the first and second resonators 15 and 16.

The substrate 11 may be a single layer that includes a single dielectric material or a multi-layer substrate that includes at least two dielectric materials different from each other. The one or more dielectric materials that constitute the substrate 11 may be an insulating material or a semiconductor material.

The first and second resonators 15 and 16 may be formed of a conductive material such as Au, Al, or Cu. The first and second resonators 15 and 16 are formed on opposite surfaces of the substrate 11 and have resonance characteristics different from each other. The different surfaces of the substrate 11 may be different layers of the substrate 11.

FIG. 2(a) shows the first resonator 15 formed on a first surface of the substrate 11, and FIG. 2(b) shows the second resonator 16 formed on a second surface of the substrate 11. Referring to FIG. 2, the first and second resonators 15 and 16 may be split-ring resonators (SSRs). That is, the first and second resonators 15 and 16 may be formed as ring shaped conductive materials respectively having gaps G1 and G2. The first and second resonators 15 and 16 may be disposed so that centers of the first and second resonators 15 and 16 may be on the same axis.

The electromagnetic characteristics of the metamaterial structure 10 may be closely related to the resonance characteristics of the first and second resonators 15 and 16. The types and sizes of the first and second resonators 15 and 16 may be controlled so that the metamaterial structure 10 may have a negative permittivity, a negative permeability, or a negative refractive index in a predetermined frequency bandwidth. That is, the metamaterial structure 10 may be controlled to have metamaterial characteristics, that is, the metamaterial structure 10 as a whole may be made to have a permittivity, a permeability, and a refractive index that are different from the inherent permittivity, permeability, and refractive index of the substrate 11 in a predetermined frequency section resonating an electromagnetic wave incident to the first and second resonators 15 and 16.

The first and second resonators 15 and 16 may have at least one of outer diameters D1 and D2, widths W1 and W2, and gaps G1 and G2 different from each other. For example, as depicted in FIG. 2, the metamaterial structure 10 according to the current embodiment may have wide bandwidth characteristics including both a high resonance frequency $f_1$ of the first resonator 15 and a low resonance frequency $f_2$ of the second resonator 16 by making the size of the first resonator 15 smaller than that of the second resonator 16. The sizes of the first and second resonators 15 and 16 are closely related to a wavelength of the electromagnetic wave to be handled. For example, the first and second resonators 15 and 16 may have sizes from a few millimetres to a few tens of millimetres with respect to an electromagnetic wave in a radio frequency (RF) region.

The gap G1 of the first resonator 15 may be oriented in a direction different from that of the gap G2 of the second resonator 16. The polarizing characteristic or phase of the electromagnetic wave to be resonated is closely related to the orientation directions of the gaps G1 and G2, and thus, the polarizing characteristic or phase of the electromagnetic wave to be resonated may be appropriately controlled by making the gaps G1 and G2 be oriented in different directions. For example, as depicted in FIG. 2, as seen from the center of a ring, the gap G1 of the first resonator 15 may be provided to be oriented in a +Y direction, and the gap G2 of the second resonator 16 may be provided to be oriented in a −Y direction. According to circumstances, as seen from the center of the ring, the orientation direction of the gap G1 of the first resonator 15 may be the same as the orientation direction of the gap G2 of the second resonator 16, or may be different by 90 degrees.

In the current embodiment, the configuration is that the first and second resonators 15 and 16 are respectively formed on the first and second surfaces of the substrate 11. However, the first and second resonators 15 and 16 are not limited thereto, that is, the plural first and second resonators 15 and 16 may be formed on the first and second surfaces of the substrate 11, plural of the first and second resonators 15 and 16 may be periodically arranged on the first and second surfaces of the substrate 11, or the first and second resonators 15 and 16 may be formed on the same surface of the substrate 11.

Next, resonance characteristics of the metamaterial structure 10 according to the current embodiment will now be described.

A numerical analysis was performed through a computer simulation with respect to an example of the metamaterial structure 10 in which the first and second resonators 15 and 16 were formed of Au on the first and second surfaces of the substrate 11, and the substrate was formed of GaAs having a permittivity $\epsilon$ of 12.9.

Figure 3A:
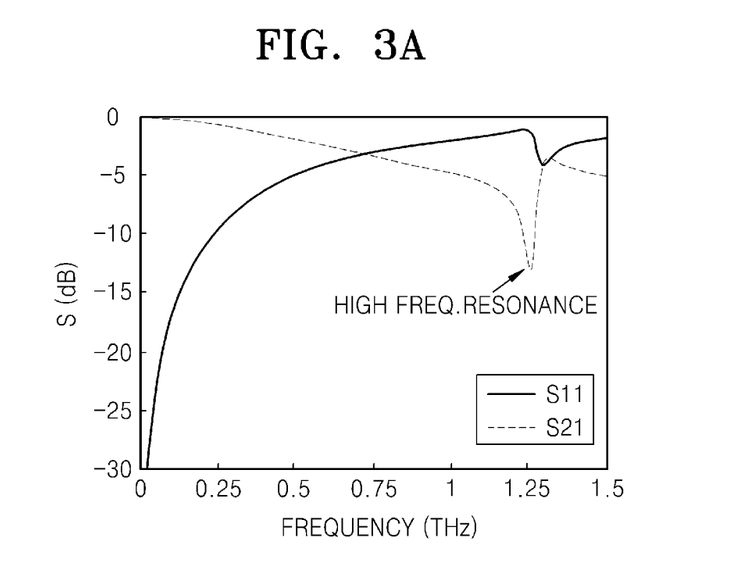
FIGS. 3A and 3B are graphs showing examples of resonance characteristics of the resonator provided on both surfaces of the metamaterial structure of FIG. 1.
Figure 3B:
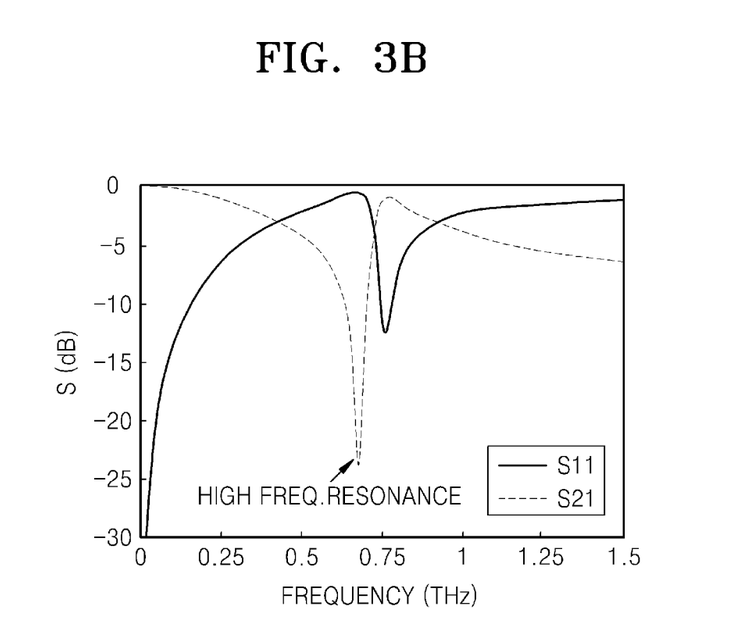
Figure 4:
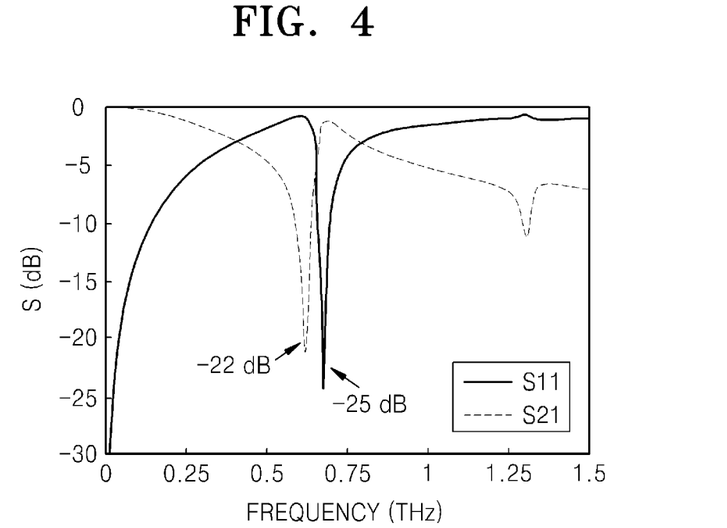
FIG. 4 is a graph showing an example of resonance characteristics of the metamaterial structure of FIG. 1.

FIGS. 3A and 3B are S-parameter graphs with respect to the first and second resonators 15 and 16, respectively, according to an exemplary embodiment. FIG. 4 is a graph showing resonance characteristics of the metamaterial structure 10 in which the first and second resonators 15 and 16 are designed together as in FIGS. 3A and 3B.

Referring to FIG. 3A, the first resonator 15 is designed to resonate in a relatively high frequency region of approximately 1.25 THz, and referring to FIG. 3B, the second resonator 16 is designed to resonate in a relatively low frequency region of approximately 0.65 THz.

Referring to FIG. 4, in the metamaterial structure 10 that includes both the first and second resonators 15 and 16 designed as described above, the permeability coefficient S21 has a value of −22 dB at approximately 0.63 THz where a resonance is generated, and the antiresonance coefficient S11 has a value of −25 dB at approximately 0.68 THz where anti-resonance is generated.

Figure 5:
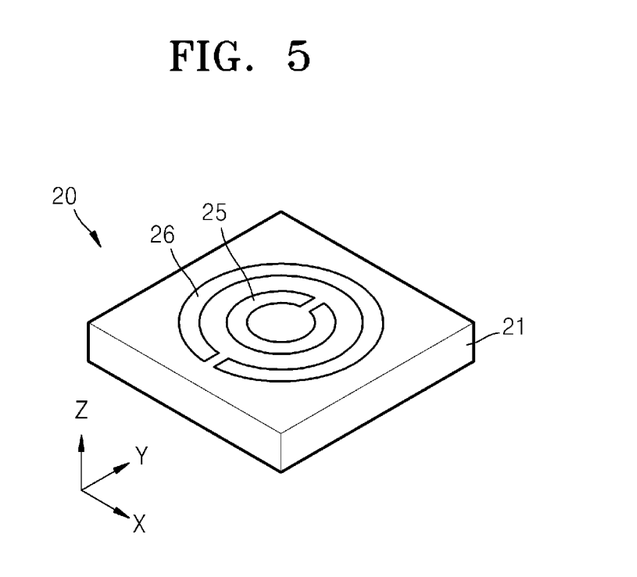
FIG. 5 is a schematic perspective view of a configuration of a metamaterial structure according to a comparative example.
Figure 6:
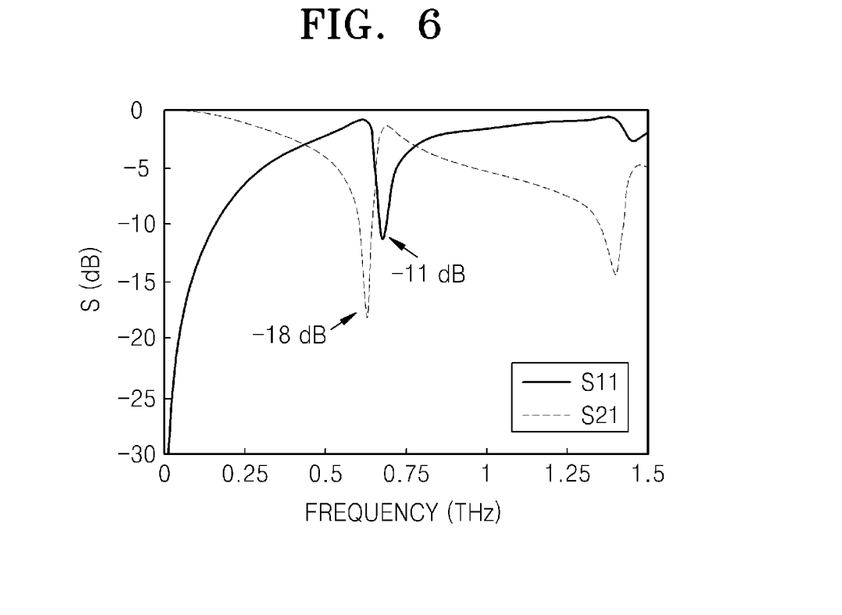
FIG. 6 is a graph showing the resonance characteristics of the metamaterial structure of FIG. 5.

FIG. 5 is a schematic perspective view of a configuration of a metamaterial structure 20 according to a comparative example of the present invention. FIG. 6 is a graph showing the resonance characteristics of the metamaterial structure 20 of FIG. 5, according to the comparative example.

Referring to FIG. 5, the metamaterial structure 20 according to the comparative example includes first and second resonators 25 and 26 formed on a surface of a substrate 21. The metamaterial structure 20 according to the comparative example is different from the metamaterial structure 10 according to the embodiment described above in that, in the metamaterial structure 10, the first and second resonators 15 and 16 are formed on opposite surfaces of the substrate 11; however, in the metamaterial structure 20, both the first and second resonators 25 and 26 are formed on the same surface of the substrate 21. Except for this, the metamaterial structure 20 is substantially the same as the metamaterial structure 10 in that, for example, the substrate 21 and the first and second resonators 25 and 26 of the metamaterial structure 20 may have the same sizes and may be respectively formed of the same materials as those of the substrate 11 and the first and second resonators 15 and 16 of the metamaterial structure 10.

Referring to FIG. 6, in the metamaterial structure 20 according to the comparative example, the value of the permeability coefficient S21 where a resonance is generated is −18 dB, and the value of antiresonance coefficient S11 where an anti-resonance is generated is −11 dB.

When the graphs of FIG. 4 and FIG. 6 are compared, it is seen that the metamaterial structure 10 according to the above-described embodiment has values of the permeability coefficient S21 where a resonance is generated and the anti-resonance coefficient S11 where an anti-resonance is generated that are respectively reinforced by 4 dB and 14 dB with respect to the comparative metamaterial structure 20. That is, the metamaterial structure 10 according to the above-described embodiment has high resonance characteristics.

Figure 7:
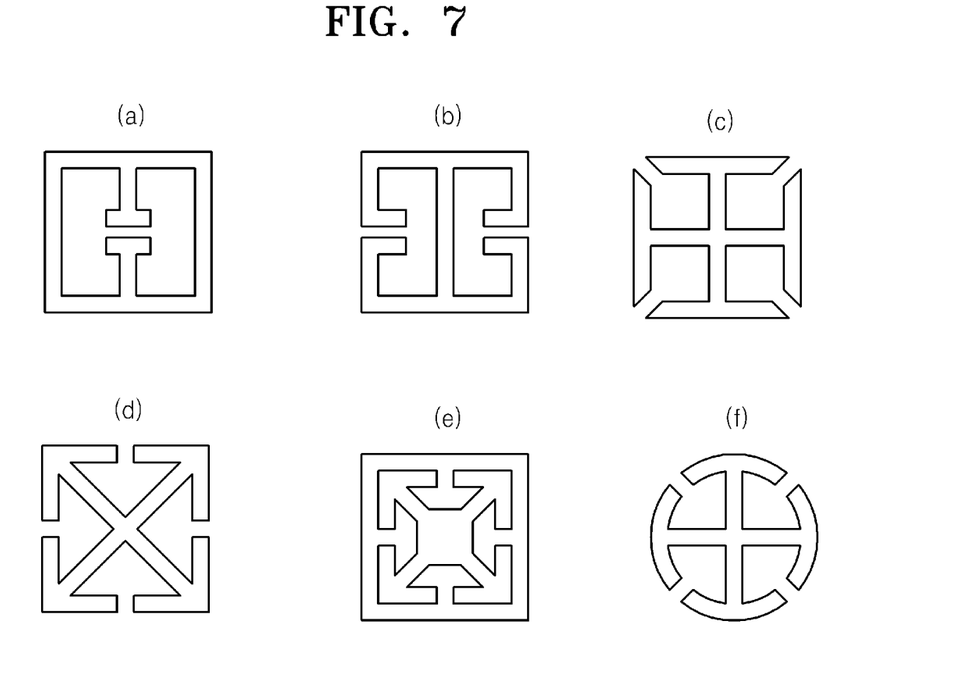
FIG. 7 shows various modified versions of resonators that may be applied to the metamaterial structure of FIG. 1.

In the described above embodiment, a metamaterial structure 10 in which the first and second resonators 15 and 16 are SRRs has been explained; however, metamaterial structures described herein are not limited thereto. FIG. 7 shows various modified versions of resonators that may generate metamaterial characteristics. As resonators that may be used as metamaterials, besides the modified versions of resonators depicted in FIG. 7, although not shown, various resonator examples are known and may be adapted to the metamaterial structure 10 of the above-described embodiment.

Furthermore, in the above-described embodiments, the rings of the first and second resonators 15 and 16 are formed of a conductive material and the gap is insulated. However, the embodiments are not limited thereto, that is, the first and second resonators 15 and 16 may have complementary structures, as compared to the previous embodiments. That is, the rings of the first and second resonators 15 and 16 may be formed of a dielectric, and regions of both of the surfaces of the substrate 11 may be coated with a conductive material except the gaps and the rings of the first and second resonators 15 and 16.

Figure 8:
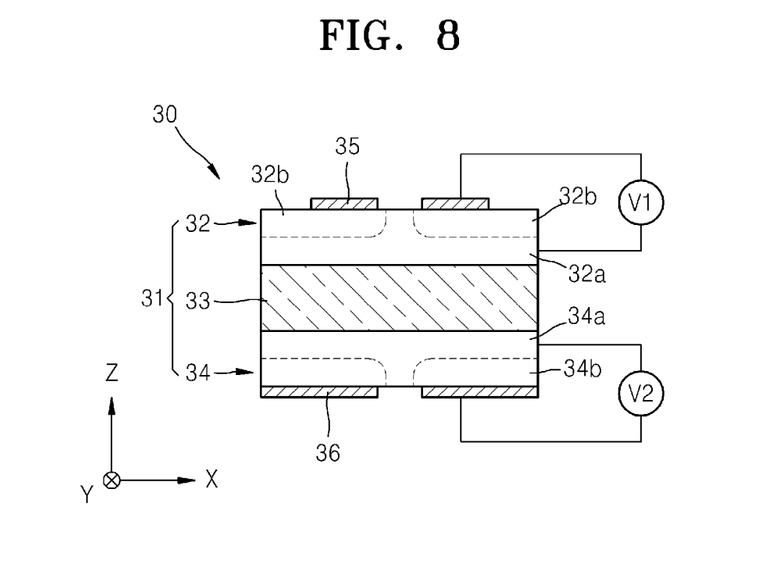
FIG. 8 is a schematic cross-sectional view of a configuration of a metamaterial structure according to another exemplary embodiment.
Figure 9:
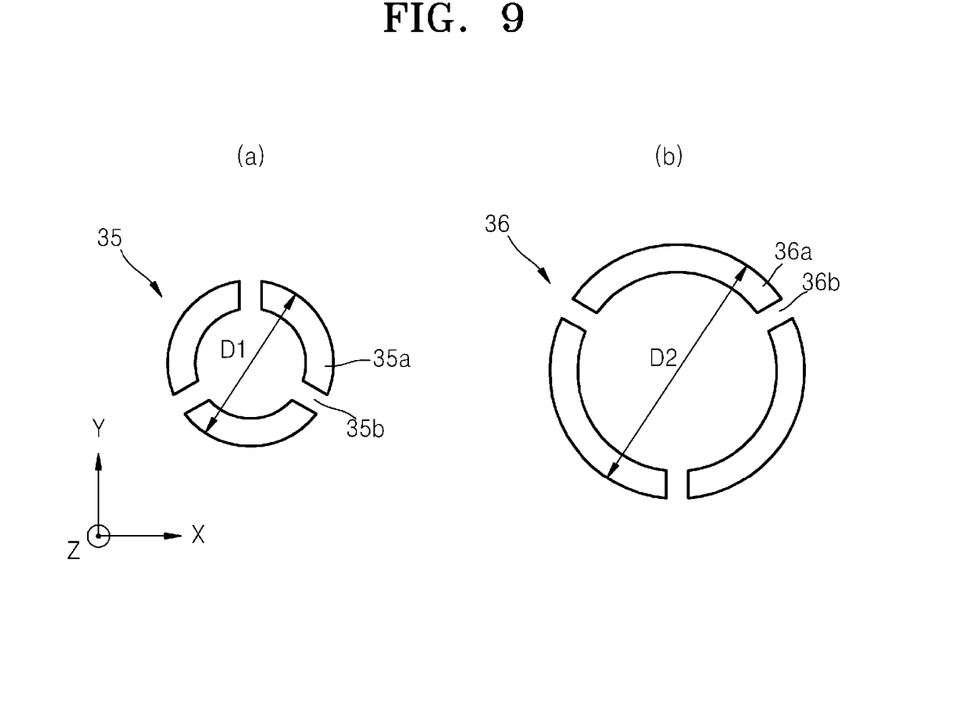
FIG. 9 shows resonators provided on both surfaces of the metamaterial structure of FIG. 8.

FIG. 8 is a schematic cross-sectional view of a configuration of a metamaterial structure 30 according to another exemplary embodiment. FIG. 9 shows first and second resonators 35 and 36 provided on opposite surfaces of the metamaterial structure 30 of FIG. 8.

Referring to FIGS. 8 and 9, the metamaterial structure 30 according to the current embodiment includes a substrate 31 and the first and second resonators 35 and 36 formed on opposite surfaces of the substrate 31. At this point, bias voltages may be independently applied to each of the first and second resonators 35 and 36 from external first and second power sources V1 and V2.

The substrate 31 may include first and second doped semiconductor layers 32 and 34 disposed on both surfaces of an insulating layer 33. For example, the insulating layer 33 may be formed of GaAs, which is a semi-insulating material, and the first and second semiconductor layers 32 and 34 may be formed by doping GaAs with an n-type dopant or a p-type dopant. According to circumstances, the first and second semiconductor layers 32 and 34 may be formed by stacking semiconductor materials having permittivities different from each other on opposite surfaces of the insulating layer 33. The first and second semiconductor layers 32 and 34 may have thicknesses equal to or different from each other.

The first and second resonators 35 and 36 are formed on opposite surfaces of the substrate 31 and may be formed to have resonance characteristics different from each other.

Figure 10:
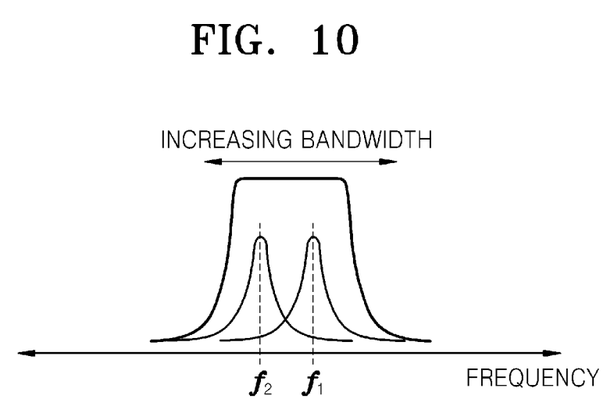
FIG. 10 is a graph showing the resonance characteristics of the metamaterial structure of FIG. 8.

FIG. 9(a) shows the first resonator 35 provided on an upper surface of the first semiconductor layer 32 (refer to FIG. 8), and FIG. 9(b) shows the second resonator 36 provided on a lower surface of the second semiconductor layer 34 (refer to FIG. 8). Referring to FIG. 9, the first and second resonators 35 and 36 may be SRRs. That is, the first and second resonators 35 and 36 may be formed, respectively, of conductive materials 35a and 36a having a ring shape with gaps 35b and 36b. The first and second resonators 35 and 36 may be disposed so that the centers of the first and second resonators 35 and 36 may be on the same axis. At this point, the first and second resonators 35 and 36 may be formed in different sizes (for example, diameters D1 and D2) so that the resonance characteristics thereof may be different from each other, or the gaps 35b of the first resonator 35 may be oriented in directions different from that of the gaps 36b of the second resonator 36. For example, the first resonator 35 is formed in a relatively small size to have a relatively high resonance frequency $f_1$, and the second resonator 36 is formed in a relatively large size to have a relatively low resonance frequency $f_2$, and thus, as shown in FIG. 10, the metamaterial structure 30 according to the current embodiment may have wide bandwidth characteristics including a high resonance frequency $f_1$ of the first resonator 35 and a low resonance frequency $f_2$ of the second resonator 36.

In the current embodiment, the three gaps 35b and 36b of each of the first and second resonators 35 and 36 are exemplary, and as described with reference to FIG. 2, the first and second resonators 35 and 36 respectively may have a one or more gaps. Furthermore, as resonators that may be used as metamaterials, the modified versions of resonators depicted in FIG. 7 and various resonator examples (not shown) may be adapted as the first and second resonators 35 and 36 according to the current embodiment.

Electrodes (not shown) for connecting electrically are provided on each of the first and second semiconductor layers 32 and 34 and the first and second resonators 35 and 36. The first power source V1 is connected to the conductive materials 35a of the first resonator 35 and the first semiconductor layer 32, and the second power source V2 is connected to the conductive materials 36a of the second resonator 36 and the second semiconductor layer 34. At this point, the conductive materials 35a and 36a of the first and second resonators 35 and 36 are respectively connected to the first and second semiconductor layers 32 and 34 via a Schottky contact, and the first and second semiconductor layers 32 and 34 are respectively connected to the first and second power sources V1 and V2 via an Ohmic contact.

Next, operation of the metamaterial structure 30 according to the current embodiment will now be described. For convenience of explanation, a case when the first and second semiconductor layers 32 and 34 are formed of GaAs doped with an n-type dopant will be explained.

When a voltage is not applied to the first resonator 35, the conductive materials 35a of the first resonator 35 may be electrically connected by the doping of the first semiconductor layer 32. In this case, a resonance is not substantially generated in the first resonator 35 by an electromagnetic wave incident to the metamaterial structure 30. Likewise, when a voltage is not applied to the second resonator 36, the conductive materials 36a of the second resonator 36 may be electrically connected by the doping of the second semiconductor layer 34, and thus, a resonance is not substantially generated in the second resonator 36.

When a negative (−) voltage is applied to the conductive materials 35a of the first resonator 35, free electrons in a region adjacent to the conductive materials 35a of the first semiconductor layer 32 are pushed away, and thus, the region becomes a depletion region 32b. The depletion region 32b blocks the current flow between the conductive materials 35a of the first resonator 35, and thus, a resonance may be generated in the first resonator 35 by an incident electromagnetic wave. Likewise, when a negative (−) voltage is applied to the conductive materials 36a of the second resonator 36, free electrons in a region adjacent to the conductive materials 36a of the second semiconductor layer 34 are pushed away, and thus, the region becomes a depletion region 34b. The depletion region 34b blocks the current flow between the conductive materials 36a of the first resonator 36, and thus, a resonance may be generated in the first resonator 36 by an incident electromagnetic wave. Reference numerals 32a and 34a represent regions where high concentrations of free electrons are maintained in the first and second semiconductor layers 32 and 34, respectively.

As described above, the characteristics of a metamaterial of the metamaterial structure 30 may be on/off controlled in real time according to whether a voltage is applied or not. Furthermore, the sizes of the depletion regions 32b and 34b may be controlled according to the amplitude of the bias voltage applied to the conductive materials 35a and 36a from the external first and second power sources V1 and V2. Since the sizes of the depletion regions 32b and 34b change the resistance and capacitance of the first and second resonators 35 and 36, the resonance frequency of an electromagnetic wave may be controlled in real time by controlling the intensity of the applied voltage.

Therefore, the metamaterial structure 30 according to the current embodiment may be used as an active device, such as an optical modulator, and thus, may control optical characteristics of the metamaterial structure 30 in real time.

Figure 11:
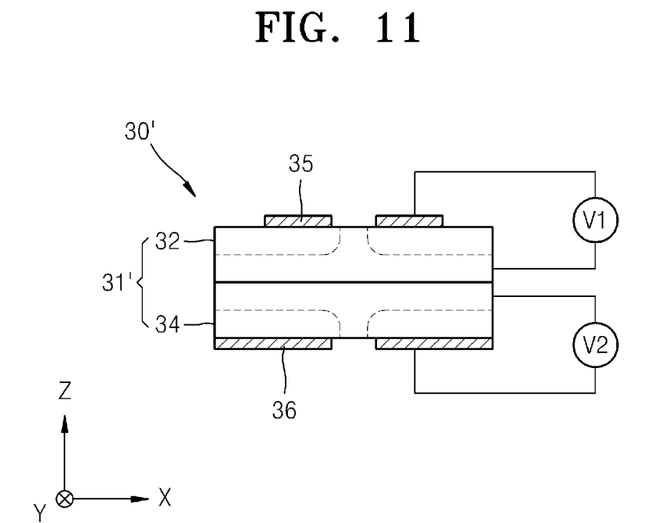
FIG. 11 is a schematic cross-sectional view of a modified version of the metamaterial structure of FIG. 8.

The metamaterial structure 30 according to the current embodiment has a configuration in which the insulating layer 33 is interposed between the first and second semiconductor layers 32 and 34; however, the insulating layer 33 may be omitted. FIG. 11 is a schematic cross-sectional view of a modified version of the metamaterial structure of FIG. 8.

Referring to FIG. 11, in a metamaterial structure 30' according to a modified version, a substrate 31' is formed such that the first and second semiconductor layers 32 and 34 directly contact each other. As described above, the depletion regions 32b and 34b are respectively formed in the first and second semiconductor layers 32 and 34 according to bias voltages applied from the external first and second power sources V1 and V2, and the depletion regions 32b and 34b are formed in regions of the substrate 31' that are close to outer surfaces thereof, where the first and second resonators 35 and 36 are formed. Therefore, although the insulating layer 33 is omitted, there is no substantial difference in the operation of the metamaterial structure 30'.

Figure 12:
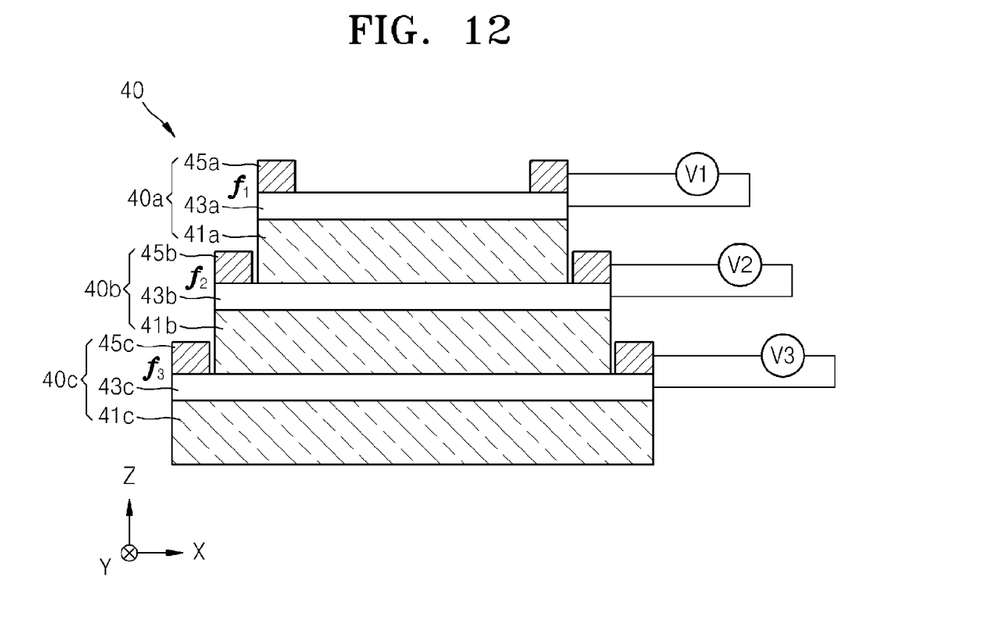
FIG. 12 is a schematic cross-sectional view of a configuration of a metamaterial structure according to another exemplary embodiment.
Figure 13:
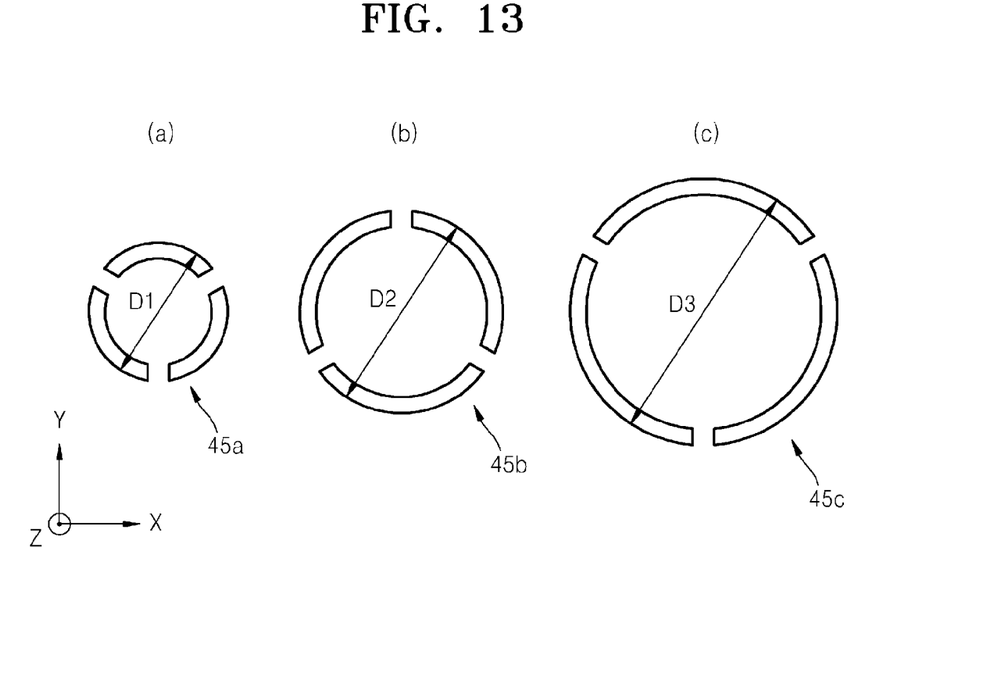
FIG. 13 shows resonators provided on both surfaces of the metamaterial structure of FIG. 12.

FIG. 12 is a schematic cross-sectional view of a configuration of a metamaterial structure 40 according to another exemplary embodiment. FIG. 13 shows first through third resonators 45a, 45b, and 45c provided on surfaces of the metamaterial structure 40 of FIG. 12.

Referring to FIGS. 12 and 13, the metamaterial structure 40 according to the current embodiment has a structure in which first through third unit metamaterials 40a, 40b, and 40c are stacked through combination of first through third substrates 41a, 41b, and 41c. In the first through third unit metamaterials 40a, 40b, and 40c, first through third semiconductor layers 43a, 43b, and 43c respectively are provided on the first through third substrates 41a, 41b, and 41c, and the first through third resonators 45a, 45b, and 45c respectively are formed on the first through third semiconductor layers 43a, 43b, and 43c. Bias voltages may be independently applied to each of the first through third resonators 45a, 45b, and 45c from external first through third power sources V1, V2, and V3. Electrodes (not shown) for connecting electrically are provided on each of the first through third semiconductor layers 43a, 43b, and 43c and the first through third resonators 45a, 45b, and 45c.

The first through third substrates 41a, 41b, and 41c may be formed of the same material or materials having permittivities different from each other. Also, the first through third semiconductor layers 43a, 43b, and 43c may be formed of the same material or materials having permittivities different from each other, and may be doped with an n-type dopant or a p-type dopant. For example, the first through third substrates 41a, 41b, and 41c may be formed of GaAs, which is semi-insulating, and the first through third semiconductor layers 43a, 43b, and 43c may be formed by doping GaAs with an n-type dopant or a p-type dopant. The first through third substrates 41a, 41b, and 41c may have thicknesses equal to or different from each other, and also, the first through third semiconductor layers 43a, 43b, and 43c may have thicknesses equal to or different from each other.

The first through third resonators 45a, 45b, and 45c respectively are provided on the first through third semiconductor layers 43a, 43b, and 43c, and may be formed to have resonance characteristics different from each other.

FIGS. 13(a),(b),(c) respectively illustrate the first through third resonators 45a, 45b, and 45c. Referring to FIG. 13, the first through third resonators 45a, 45b, and 45c may be SRRs. The first through third resonators 45a, 45b, and 45c may be disposed so that the centers thereof may be on the same axis. The first through third resonators 45a, 45b, and 45c may be formed to have sizes (for example, diameters D1, D2, and D3) different from each other or the gaps thereof may be oriented in directions different from each other so that the resonance characteristics thereof may be different from each other.

Figure 14:
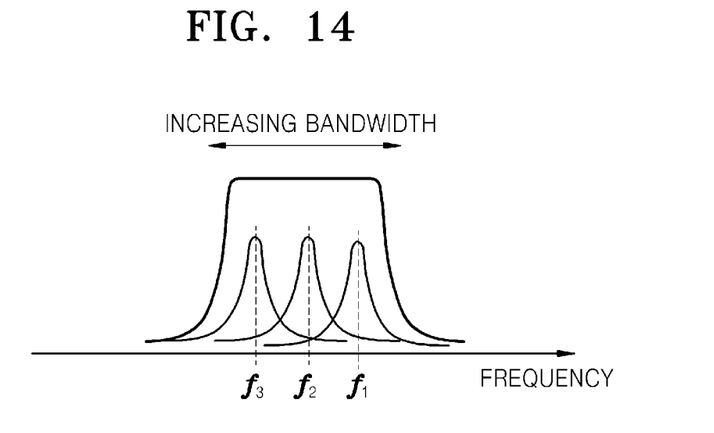
FIG. 14 is a graph showing the resonance characteristics of the metamaterial structure of FIG. 12.

For example, the first resonator 45a may be formed in a relatively small size to have a relatively high resonance frequency $f_1$, the second resonator 45b may be formed in a relatively medium size to have a relatively medium size resonance frequency $f_2$, and the third resonator 45c may be formed in a relatively large size to have a relatively low resonance frequency $f_3$, and thus, as depicted in FIG. 14, the metamaterial structure 40 according to the current embodiment may have wide bandwidth characteristics including the high, medium, and low resonance frequencies $f_1$, $f_2$, and $f_3$ of the first through third resonators 45a, 45b, and 45c.

The first substrate 41a and the first semiconductor layer 43a have an area smaller than that of the second substrate 41b and the second semiconductor layer 43b, and thus, an outer region of the second semiconductor layer 43b may be exposed to the outside. Since the second resonator 45b according to the current embodiment has an SRR structure, the second resonator 45b may be provided on the exposed outer region of the second semiconductor layer 43b. Likewise, the second substrate 41b and the second semiconductor layer 43b have an area smaller than that of the third substrate 41c and the third semiconductor layer 43c, and thus, an outer region of the third semiconductor layer 43c is exposed to the outside, and the third resonator 45c may be provided on the exposed outer region of the third semiconductor layer 43c. The first resonator 45a is provided on the uppermost surface of the metamaterial structure 40, and thus, is exposed to the outside. In this way, since the first through third resonators 45a, 45b, and 45c are exposed to the outside, the first through third resonators 45a, 45b, and 45c respectively may be readily electrically wired to external first through third power sources V1, V2, and V3.

The first power source V1 is connected to the first resonator 45a and the first semiconductor layer 43a, the second power source V2 is connected to the second resonator 45b and the second semiconductor layer 43b, and the third power source V3 is connected to the third resonator 45c and the third semiconductor layer 43c. At this point, the first through third resonators 45a, 45b, and 45c respectively are connected to the first through third semiconductor layers 43a, 43b, and 43c via a Schottky contact, and the first through third semiconductor layers 43a, 43b, and 43c respectively are connected to the first through third power sources V1, V2, and V3 via an Ohmic contact.

The operation of the metamaterial structure 40 according to the current embodiment is substantially the same as that of the metamaterial structure 30 described with reference to FIGS. 8 through 10 except that the metamaterial structure 40 includes three resonance frequencies to be controlled. That is, when voltages are not applied to the first through third resonators 45a, 45b, and 45c, the first through third resonators 45a, 45b, and 45c may be electrically connected to each other via the highly doped state of the first through third semiconductor layers 43a, 43b, and 43c by bypassing the gaps, and thus, a resonance is not substantially generated. However, when voltages are applied to the first through third resonators 45a, 45b, and 45c, depletion regions are formed in the first through third semiconductor layers 43a, 43b, and 43c near the gaps of the first through third resonators 45a, 45b, and 45c, and thus, an electrical flow is effectively blocked, and accordingly, a resonance may be generated by an incident electromagnetic wave.

As described above, the metamaterial characteristics of each of the first through third unit metamaterials 40a, 40b, and 40c may be controlled in real time according to whether a voltage is applied or not or according to the amplitude of the voltage. Therefore, the metamaterial structure 40 according to the current embodiment may function as an active device.

In the current embodiment, since the second and third resonators 45b and 45c have an SRR structure, the second and third resonators 45b and 45c may be respectively provided on the outer regions of the second and third semiconductor layers 43b and 43c; however, the current embodiment is not limited thereto. As resonators that may be used as metamaterials, the modified versions of resonators depicted in FIG. 7 and various resonator examples (not shown) may be used as the first through third resonators 45a, 45b, and 45c according to the current embodiment. In this case, portions of the second and third resonators 45b and 45c may be exposed on the exposed outer regions of the second and third semiconductor layers 43b and 43c.

Also, in the current embodiment, a case when the metamaterial structure 40 has three unit metamaterial structures is described as an example. However, the current embodiment is not limited thereto and the metamaterial structure 40 may include two unit metamaterial structures, or may include to four or more unit metamaterial structures.

Figure 15:
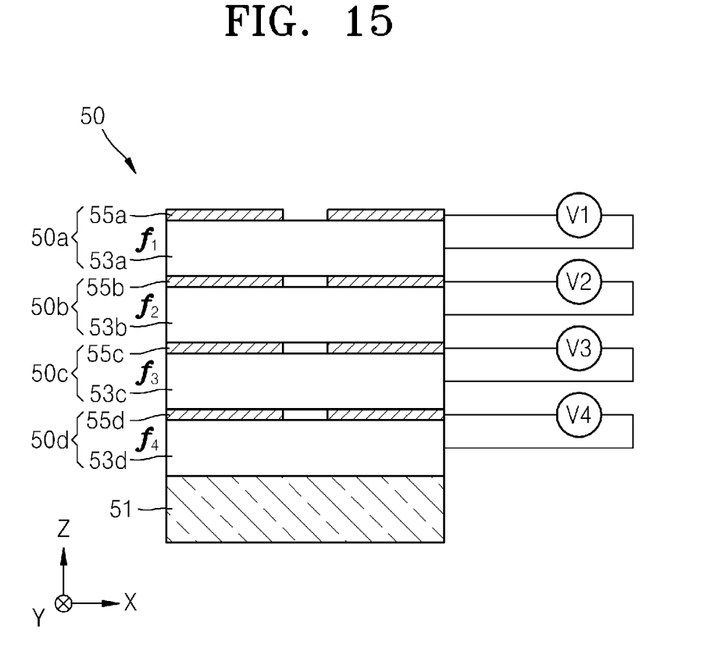
FIG. 15 is a schematic cross-sectional view of a configuration of a metamaterial structure according to another exemplary embodiment.
Figure 16:
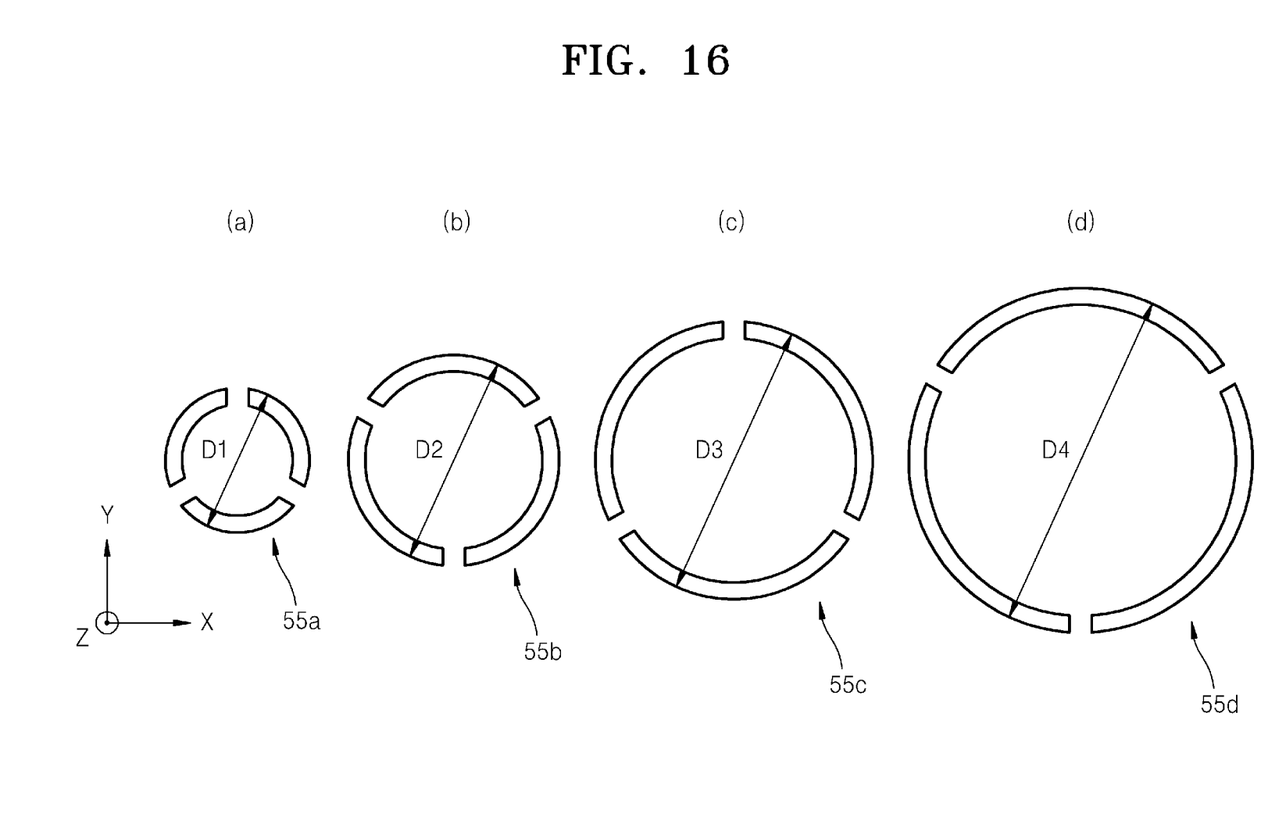
FIG. 16 shows resonators provided on both surfaces of the metamaterial structure of FIG. 15.

FIG. 15 is a schematic cross-sectional view of a configuration of a metamaterial structure 50 according to another exemplary embodiment of. FIG. 16 shows first through fourth resonators 55a, 55b, 55c, and 55d provided on surfaces of the metamaterial structure 50 of FIG. 15.

Referring to FIGS. 15 and 16, the metamaterial structure 50 according to the current embodiment has a structure in which first through fourth unit metamaterials 50a, 50b, 50c, and 50d are stacked on a substrate 51. The metamaterial structure 50 is formed by sequentially stacking the first through fourth unit metamaterials 50a, 50b, 50c, and 50d on the substrate 51 in the order stated. The first through fourth unit metamaterials 50a, 50b, 50c, and 50d respectively include first through fourth semiconductor layers 53a, 53b, 53c, and 53d, and the first through fourth resonators 55a, 55b, 55c, and 55d respectively formed on the first through fourth semiconductor layers 53a, 53b, 53c, and 53d. Bias voltages may be independently applied to each of the first through fourth resonators 55a, 55b, 55c, and 55d from external first through fourth power sources V1, V2, V3, and V4. Electrodes (not shown) for connecting electrically are provided on each of the first through fourth semiconductor layers 53a, 53b, 53c, and 53d and the first through fourth resonators 55a, 55b, 55c, and 55d.

The substrate 51 may be formed of an insulating material or a semiconductor material. The first through fourth semiconductor layers 53a, 53b, 53c, and 53d may be formed of the same semiconductor material or semiconductor materials having permittivities different from each other by doping an n-type dopant or a p-type dopant. For example, the substrate 51 may be formed of semi-insulating GaAs, and the first through fourth semiconductor layers 53a, 53b, 53c, and 53d may be formed by doping GaAs with an n-type dopant or a p-type dopant. The first through fourth semiconductor layers 53a, 53b, 53c, and 53d may have thicknesses equal to or different from each other.

The first through fourth resonators 55a, 55b, 55c, and 55d respectively are provided on the first through fourth semiconductor layers 53a, 53b, 53c, and 53d, and are formed to have resonance characteristics different from each other. Since the first through fourth semiconductor layers 53a, 53b, 53c, and 53d respectively may be understood as different layers of the substrate 51 in a broad sense, also it may be understood that the first through fourth resonators 55a, 55b, 55c, and 55d are formed on the different layers of the substrate 51.

FIGS. 16(a),(b),(c), and (d) show the first through fourth resonators 55a 55b, 55c, and 55d, respectively. Referring to FIG. 16, the first through fourth resonators 55a, 55b, 55c, and 55d may be SRRs. The first through fourth resonators 55a, 55b, 55c, and 55d may be disposed so that the centers thereof may be on the same axis. The first through fourth resonators 55a, 55b, 55c, and 55d may be formed in sizes (for example, diameters D1, D2, D3, and D4) different from each other or gaps thereof may be oriented in directions different from each other so that the first through fourth resonators 55a, 55b, 55c, and 55d may have resonance characteristics different from each other.

Figure 17:
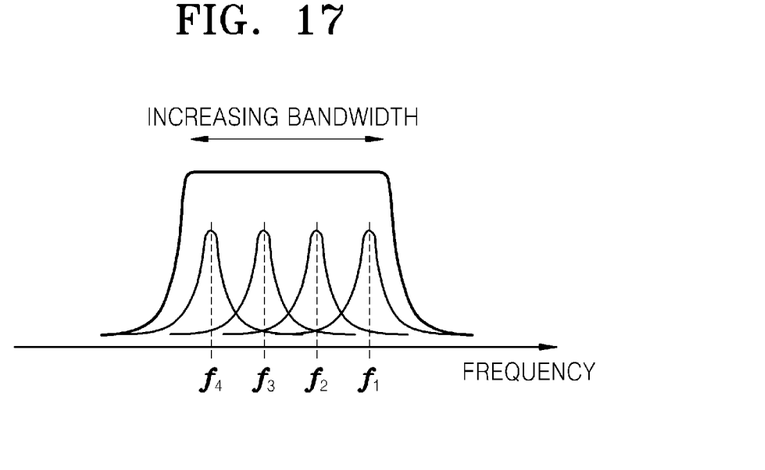
FIG. 17 is a graph showing the resonance characteristics of the metamaterial structure of FIG. 15.

For example, the first through fourth resonators 55a, 55b, 55c, and 55d may be formed to have resonance frequencies $f_1$, $f_2$, $f_3$, and $f_4$ different from each other by sequentially differing the sizes of the first through fourth resonators 55a, 55b, 55c, and 55d. In this case, as depicted in FIG. 17, the metamaterial structure 50 according to the current embodiment may have wide bandwidth characteristics that include all of the resonance frequencies $f_1$, $f_2$, $f_3$, and $f_4$ of the first through fourth resonators 55a, 55b, 55c, and 55d.

The first power source V1 is connected to the first resonator 55a and the first semiconductor layer 53a, the second power source V2 is connected to the second resonator 55b and the second semiconductor layer 53b, the third power source V3 is connected to the third resonator 55c and the third semiconductor layer 53c, and the fourth power source V4 is connected to the fourth resonator 55d and the fourth semiconductor layer 53d. At this point, the first through fourth resonators 55a, 55b, 55c, and 55d respectively are connected to the first through fourth semiconductor layers 53a, 53b, 53c, and 53d via a Schottky contact, and the first through fourth semiconductor layers 53a, 53b, 53c, and 53d respectively are connected to the first through fourth power sources V1, V2, V3, and V4 via an Ohmic contact.

The operation of the metamaterial structure 50 according to the current embodiment is substantially the same as that of the metamaterial structures 30 and 40 described with reference to FIGS. 8 through 10 and FIGS. 11 through 13 except that the metamaterial structure 50 includes four resonance frequencies to be controlled. That is, when voltages are not applied to the first through fourth resonators 55a, 55b, 55c, and 55d, the first through fourth resonators 55a, 55b, 55c, and 55d may be electrically connected to each other via the highly doped state of the first through fourth semiconductor layers 53a, 53b, 53c, and 53d by bypassing the gaps, and thus, a resonance is not substantially generated. However, when voltages are applied to the first through fourth resonators 55a, 55b, 55c, and 55d, depletion regions are formed in the first through fourth semiconductor layers 53a, 53b, 53c, and 53d near the gaps of the first through fourth resonators 55a, 55b, 55c, and 55d, and thus, an electrical flow is effectively blocked, and accordingly, a resonance may be generated by an incident electromagnetic wave.

As described above, the metamaterial characteristics of each of the first through fourth unit metamaterials 50a, 50b, 50c, and 50d may be controlled in real time according to whether a voltage is applied or not or the amplitude of the voltage. Therefore, the metamaterial structure 50 according to the current embodiment may function as an active device.

Also, in the current embodiment, a case when the first through fourth resonators 55a, 55b, 55c, and 55d are SRRs is described as an example. As resonators that may be used as metamaterials, the modified versions of resonators depicted in FIG. 7 and various resonator examples (not shown) may be used as the first through fourth resonators 55a, 55b, 55c, and 55d according to the current embodiment. Also, in the current embodiment, the metamaterial structure 50 having four unit metamaterial structures is described as an example; however, the current embodiment is not limited thereto and the metamaterial structure 50 may include two or three unit metamaterial structures, or may extend to more than five unit metamaterial structures.

The metamaterial structures described in the above embodiments may have one or more of the following advantages.

First, the resonance characteristics may be increased by disposing resonators having resonance frequencies different from each other on each of the layers of the substrate.

Second, resonance frequency and frequency bandwidth may be actively controlled through an electrical control with respect to resonators having resonance characteristics different from each other.

Third, electrical controls with respect to resonators may be performed in each of the layers.

While the metamaterial structures described herein have been described with reference to the embodiments depicted in drawings for better understanding, it will be understood by those skilled in the art that various changes in form and details may be made therein without departing from the spirit and scope of the inventive concept as defined by the appended claims.

What is claimed is:

1. A metamaterial structure comprising:
a substrate; and
at least a first resonator and a second resonator disposed on different surfaces of the substrate or on different layers of the substrate, wherein the first and second resonators have resonance characteristics different from each other,
wherein the metamaterial structure has a permittivity, a permeability, and a refractive index which are different respectively from a permittivity, a permeability, and a refractive index of the substrate in a predetermined frequency bandwidth.

2. The metamaterial structure of claim 1, wherein the first and second resonators have resonance frequencies different from each other.

3. The metamaterial structure of claim 1, wherein each of the first and second resonators is a split-ring resonator having at least one gap.

4. The metamaterial structure of claim 3, wherein
the substrate comprises at least a first layer and a second layer, the first resonator is disposed on the first layer and the second resonator is disposed on the second layer, and
the at least one gap of the first resonator has a size different from a size of the at least one gap of the second resonator.

5. The metamaterial structure of claim 3, wherein the at least one gap of the first resonator is oriented in a direction different from a direction in which the gap of the second resonator is oriented.

6. The metamaterial structure of claim 1, wherein the substrate is a single layer substrate comprising one dielectric material or a multi-layer substrate comprising at least two different dielectric materials.

7. The metamaterial structure of claim 1, wherein the substrate comprises at least one dielectric comprising an insulating material, an n-type semiconductor material, or a p-type semiconductor material.

8. The metamaterial structure of claim 1, further comprising electrodes that are electrically connected to the resonators.

9. The metamaterial structure of claim 8, wherein the substrate comprises a conductive semiconductor layer comprising an n-type carrier or a p-type carrier.

10. The metamaterial structure of claim 9, wherein the substrate further comprises an insulating layer.

11. The metamaterial structure of claim 8, wherein the first resonator is disposed on a first layer of the substrate and the second resonator is disposed on a second layer of the substrate, and the first and second resonators are independently electrically controlled.

12. The metamaterial structure of claim 1, wherein:
the substrate comprises a layered step structure comprising a plurality of layers in which areas of the layers decrease from a lowermost layer to an uppermost layer, and
the at least the first and second resonators comprise a plurality of resonators, each of the plurality of resonators disposed on one of the plurality of layers of the substrate, and each of the plurality of resonators exposed outside the substrate.

13. The metamaterial structure of claim 8, wherein the first and second resonators have resonance frequencies different from each other.

14. The metamaterial structure of claim 8, wherein each of the first and second resonators is a split-ring resonator comprising at least one gap.

15. The metamaterial structure of claim 14, wherein:
the substrate comprises at least a first layer and a second layer;
the first resonator is disposed on the first layer and the second resonator is disposed on the second layer; and
the gap of the first resonator has a size different from the gap of the second resonator.

16. The metamaterial structure of claim 3, wherein:
the substrate comprises at least a first layer and a second layer;
the first resonator is disposed on the first layer and the second resonator is disposed on the second layer; and
the gap of the first resonator is oriented in a direction which is different from a direction in which the gap of the second resonator is oriented.

17. A metamaterial structure comprising:
a substrate comprising a first surface and a second surface; and
a first resonator disposed on the first surface and a second resonator disposed on the second surface;
wherein the first resonator has resonance characteristics different from resonance characteristics of the second resonator; and
wherein the metamaterial structure has a permittivity, a permeability, and a refractive index which are different respectively from a permittivity, a permeability, and a refractive index of the substrate in a predetermined bandwidth.

18. The metamaterial structure of claim 17, wherein:
the substrate comprises a first layer and a second layer, wherein the first surface is on the first layer and the second surface is on the second layer.

19. The metamaterial structure of claim 17, wherein:
the first resonator is a split-ring resonator having a gap therein and the second resonator is a split-ring resonator having a gap therein, and
the gap of the first resonator is oriented in a direction different from a direction in which the gap of the second resonator is oriented.

20. The metamaterial structure of claim 17, wherein:
the first resonator is a split-ring resonator having a gap therein and the second resonator is a split-ring resonator having a gap therein, and
an outer diameter of the first resonator is different from an outer diameter of the second resonator.

21. The metamaterial structure of claim 18, further comprising:
a third resonator disposed on a third surface,
wherein the substrate further comprises a third layer and the third surface is on the third layer.

* * * * *